Oct. 3, 1933.        S. P. GRIFFIN ET AL        1,929,276
CINEMATOGRAPH APPARATUS

Filed Nov. 21, 1932

Samuel Palser Griffin
Arthur Percy Johnson
INVENTORS

By
their Attorney

Patented Oct. 3, 1933

1,929,276

UNITED STATES PATENT OFFICE 1,929,276

CINEMATOGRAPH APPARATUS

Samuel Palser Griffin, Small Heath, Birmingham, and Arthur Percy Johnson, Wylde Green, Birmingham, England Application November 21, 1932, Serial No. 643,578, and in Great Britain May 13, 1931

2 Claims. (Cl. 88—24)

This invention relates to cinematograph projecting apparatus. In such apparatus the heat of the light beam is liable to set fire to, or damage or discolor the film being projected, and the invention refers more particularly to that type of apparatus in which the light is passed through a chamber containing water or other liquid disposed between the light and the film.

In apparatus of this class the transparent sides of the water or liquid chamber are liable to become misty owing to condensation thereon of moisture from the atmosphere, and the primary object of the present invention is to provide an improved apparatus whereby this tendency to mistiness is avoided.

Referring to the drawing:—

Figure 1:
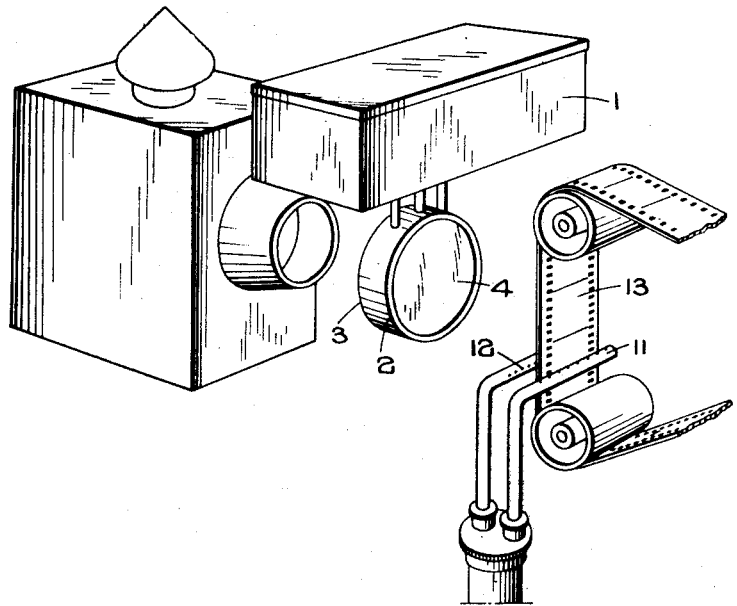
Figure 1 is a perspective view showing one form of the apparatus.
Figure 2:
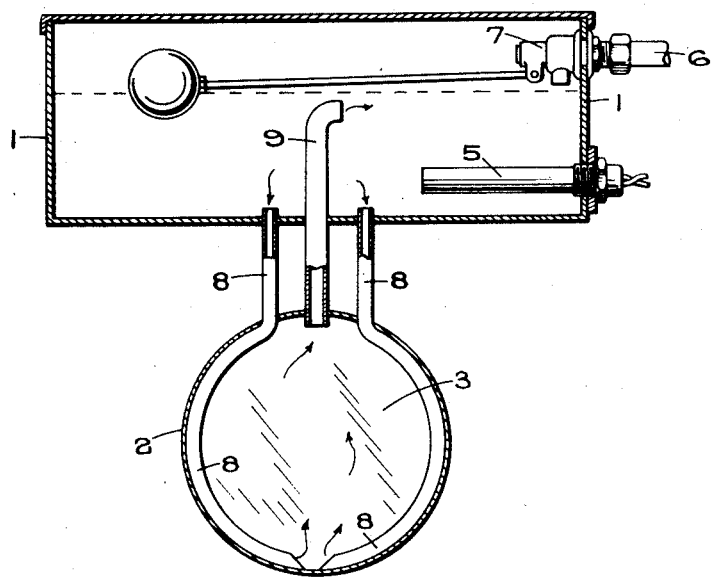
Figure 2 is a sectional view showing the liquid system.

In the construction illustrated, the tank 1 is arranged above the liquid chamber 2, and the liquid chamber is of circular form having glass or other transparent sides 3 and 4, either of which may be of plane glass or formed as a lens.

Within the tank 1 arranged above the liquid chamber is placed an electric immersion heater 5 with which may be associated means for regulating the current to keep the liquid in the tank at any desired temperature which may approximate to or be below boiling point.

A feed pipe 6 may be provided at the upper part of the tank, and this feed pipe may be provided with a float valve 7 for controlling the flow of liquid into the tank.

Two pipes 8 lead the liquid from the lower part of the tank 1 to the lower part of the chamber 2, these pipes extending downwardly from the bottom of the tank 1 and being taken around inside the periphery of the chamber and having their outlets disposed at the bottom thereof. A return pipe 9 leading back to the tank extends upwardly from the upper part of the chamber 2 and terminates within the upper part of the tank 1.

In addition, for cooling the film, a blower may be provided having nozzles or discharge members 11, 12, for blowing cold air on to one or both sides of the film 13, or on to that part of the film which is passing through the gate.

It will be understood that the liquid in the chamber 2 is heated by the heat from the projecting lamp and becomes hotter than the liquid in the tank 1 so that a circulation is maintained by the liquid flowing up the pipe 9 and down the pipes 8. The liquid in the tank 1 cools below the temperature of the liquid in the chamber 2, but its temperature is maintained at a level such that on entering the chamber 2 it does not cool the sides 3 and 4 sufficiently to cause condensation.

What we claim then is:—

1. Cinematograph projection apparatus comprising a main tank, a light-pervious chamber disposed in the path of the projecting light beam at a level below the tank and communicating with the same, cooling liquid in said chamber and said tank, a pair of oppositely disposed inflow pipes connecting the lower part of the chamber and the tank, a return pipe connecting the upper part of the chamber and the tank, and means within the tank for preheating the liquid prior to projection operation to raise said liquid to a temperature sufficient to eliminate condensation.

2. Cinematograph projection apparatus comprising a main tank, a cylindrical light-pervious chamber disposed in the path of the projecting light beam at a level below the tank and communicating with the same, cooling liquid in said chamber and said tank, a pair of inflow pipes connecting the lower part of the chamber and the tank, said pipes extending peripherally within said chamber, a return pipe connecting the upper part of the chamber and the tank, and means within the tank for preheating the liquid therein prior to projection operation so as to raise the liquid to a temperature sufficient to eliminate condensation.

SAMUEL PALSER GRIFFIN.
ARTHUR PERCY JOHNSON.